United States Patent [19]
True et al.

[11] 3,710,890
[45] Jan. 16, 1973

[54] AIRCRAFT ENGINE NOISE SUPPRESSION

[75] Inventors: Harold C. True, Seattle, Wash.; Richard D. Fitzsimmons, Arlington, Va.

[73] Assignee: The Boeing Company, Seattle, Wash.

[22] Filed: Sept. 27, 1971

[21] Appl. No.: 184,137

[52] U.S. Cl. .....181/33 HC, 181/33 HD, 239/265.13
[51] Int. Cl. .....................B64d 33/06, F01n 1/14
[58] Field of Search ......181/33 HB, 33 HC, 33 HD; 239/265.13, 265.17, 265.19, 265.23; 60/262, 264

[56] References Cited

UNITED STATES PATENTS

| | | | |
|---|---|---|---|
| 3,067,968 | 12/1962 | Heppenstall | 181/33 HC UX |
| 3,084,507 | 4/1963 | Kleinhans et al. | 181/33 HC UX |
| 3,579,993 | 5/1971 | Tanner et al. | 181/33 HC X |
| 3,581,841 | 6/1971 | Raynes | 239/265.13 X |

OTHER PUBLICATIONS

Greatrex, E. B. "Reduction of Jet Noise," In Flight. 68(2424): p. 57–60. July 8, 1955.

National Advisory Committee for Aeronautics Technical Note 4317; "Turbojet Engine Noise Reduction with Mixing Nozzle-Ejector Combinations," August, 1958, Washington, D.C.

*Primary Examiner*—Richard B. Wilkinson
*Assistant Examiner*—John F. Gonzales
*Attorney*—Glen Orlob et al.

[57] ABSTRACT

An exhaust nozzle noise suppression apparatus adapted for attachment to existing aircraft jet engines. The exhaust flow is directed by a centerbody plug into the inside of a series at least 20 corrugated lobes spaced around the existing exhaust passageway. An ejector shroud is closely spaced around the lobes to entrain large quantities of ambient air along the outside of the lobes by ejector action to increase the mass flow within the shroud while decreasing the velocity of the exhaust gases. The decreased velocity results in substantially attenuated jet noise levels. Total thrust output is maintained despite the decreased velocity because of the increased mass flow. Preferred embodiments utilize a centerbody valve means for either forcing all flow outwardly through the lobes for sound suppression or allowing flow through the center of the lobe array for cruise flight.

15 Claims, 9 Drawing Figures

PATENTED JAN 16 1973

INVENTORS,
HAROLD C. TRUE
RICHARD D. FITZSIMMONS
BY
Bernard A. Donahue
ATTORNEY

INVENTORS,
HAROLD C. TRUE
RICHARD D. FITZSIMMONS
BY
ATTORNEY

AIRCRAFT ENGINE NOISE SUPPRESSION

FIELD OF THE INVENTION

This invention relates to aircraft jet engine noise suppression; and more particularly, to exhaust nozzle apparatus utilizing a specified type of multi-lobe mixing nozzle in combination with an ejector shroud for the purpose of reducing jet noise while maintaining acceptable thrust levels.

BACKGROUND OF THE INVENTION

The noise environment generated by aircraft jet engines is usually categorized as being either of turbomachinery origin or involving "jet noise" caused by the shearing action of the molecules of the exhaust stream acting on the surrounding atmosphere. In the past, many sound suppressor systems have been proposed for reducing jet noise, usually involving breaking the primary exhaust stream into a plurality of smaller, high velocity cylindrical jet streams to improve the mixing action with the ambient air. However, such systems have created substantial performance penalties because of local base area drag which occurs in the nozzle regions intermediate the smaller jet streams.

The level of jet noise generated by a jet stream is an exponential function of the velocity of the jet. Therefore, one method of substantially suppressing jet noise is simply to reduce the jet velocity. However, since engine thrust is the product of the jet velocity and the engine mass flow, thrust will be reduced unless the mass flow is somehow increased to compensate for the decreased jet velocity.

OBJECTS OF THE INVENTION

It is a primary object of this invention to teach the construction of noise suppression apparatus which may be readily attached to existing jet engines currently in service and which involves a mixing nozzle and ejector shroud system for changing the nature of the engine exhaust from a high velocity, low mass flow jet to a lower velocity, higher mass flow jet to thereby reduce noise while maintaining a comparable thrust output.

A related object of this invention is to reroute all of the primary exhaust flow of a jet engine from its original stream tube outwardly into a corrugated flow pattern having at least 20 lobes located within an ejector shroud wherein the exhaust gases are discharged in a manner which will entrain a large volume of ambient air drawn by ejector action from secondary air passageways at the forward end of the ejector shroud so as to substantially increase the effective total mass flow while reducing exhaust jet velocity.

A further related object is to provide a noise suppression apparatus through which flow may optionally be routed only during flight in the vicinity of the airport and which therefore poses a minimal penalty on engine performance during cruise flight.

A further object of this invention is to teach the use of at least 20 corrugated fluted lobes of particular shape and size to convey exhaust gases from an original cylindrical pattern outwardly into a larger annular region within a closely spaced ejector shroud for mixing with large quantities of ambient air drawn by ejector action from the forward region of the shroud, to thereby create greater mass flow with reduced velocity at the exit plane of the shroud.

SUMMARY OF THE INVENTION

Each of the above objectives have been achieved in the preferred embodiments of this invention wherein for noise suppression, the exhaust flow of an engine is ducted into the inside of a series of corrugated fluted lobes surrounding the original exhaust passageway. Secondary air is entrained by ejector action between the outside of the fluted lobes and the inside of a closely spaced ejector shroud. Optional turbo-jet, fan-jet, single and double shroud embodiments are presented. Each preferred configuration is characterized by the routing of the exhaust flow into at least 20 equal area fluted lobes which have equal average widths W and a pitch distance P between adjacent lobe centerlines ranging from 2W to 4W. The height H of the lobes is set at a value to give a desired total lobe exit area for the engine cycle; typically H will range from 4W to 12W. For flow efficiency, the length, $L_1$, of each lobe is specified to range from 1.5 times to 3.0 times the height H of the lobe. For proper ejector pumping action, the ejector shroud is spaced apart from the lobes by a distance ranging from approximately W/4 to 3W. The ejector shroud extends from the exit plane of the lobes for a length $L_2$, at least 10 times the lobe pitch P, in order to provide for relatively complete mixing and noise attenuation prior to discharge at an exit plane defined by the aft end of the shroud.

DESCRIPTION OF THE PREFERRED EMBODIMENTS

Figure 1:
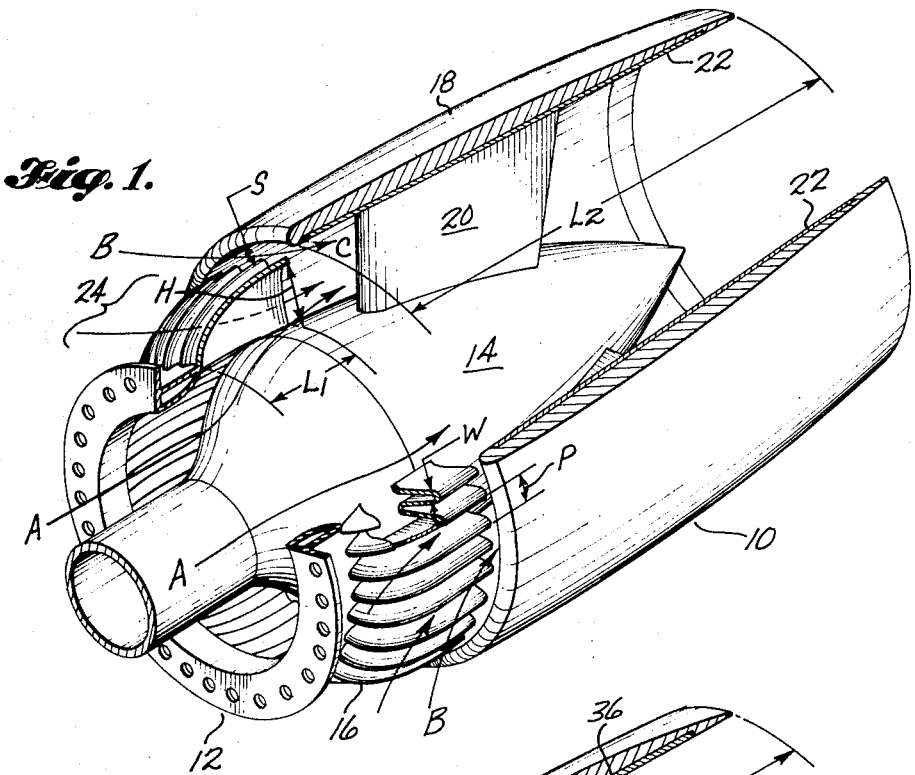
FIG. 1 is an isometric view of a single shroud embodiment of the invention.

FIG. 1 is an isometric view of a sound suppressor apparatus 10 which may be readily secured by means of attachment ring 12 to the aft exhaust flange of a jet engine. A bulbous centerbody plug 14 is shaped to direct the engine exhaust gas flow A outwardly into the passageways formed by lobes 16. Lobes 16 are preferably formed by a continuous corrugated sheet structure which surrounds and extends outwardly from the original path of the primary exhaust gases A. For purposes of this invention at least 20 lobes should be utilized. The suppressor depicted in FIG. 1 is a 32-lobe embodiment which is designed to have noise attenuation characteristics of the order of 15 PNdB with minimal thrust losses. Similar embodiments with 36 and 48 lobes have shown excellent results on the test stand. An ejector shroud 18 extends aft from the region of the exit plane of lobes 16 and is attached to centerbody plug 14 by struts 20. Shroud 18 is lined along its interior length with a sound absorbing material 22.

From the cutaway sections of FIG. 1 it can be seen that the lobes 16 are formed by a continuous corrugated or folded structural sheet, the inside of which is in direct communication with the primary exhaust gases A. The inner periphery of the lobes at their exit ends is in contact with the centerbody plug 14. Accordingly, all of the primary exhaust gas flow A is forced outwardly through the inside of lobes 16. Each generally rectangular lobe 16 has a predetermined average width W, length L, and offset height H from the centerbody plug. The lobe structure functions to turn the gases from an inner annular or cylindrical stream tube, outwardly to a corrugated pattern within an annular area surrounding the original stream tube. The pitch distance P between adjacent lobes is preferably within the range of from 2W to 2W, and the total number of lobes should exceed 20, in order to properly disperse the gases for ejector action in entraining ambient air, and also to raise the frequencies of the sound generated by the mixing of gases to ranges readily attenuable by the acoustically lined shroud system of this invention. The W and H dimensions of each lobe are selected to provide an optimum compromised area for engine cycle and flow efficiency, ejector action, and jet noise frequency shift.

In the region just forward of the shroud 18 is an inlet passageway 24 for entraining the secondary air flow B over the outside of the corrugated lobes 16. The forward end of shroud 18 closely surrounds the outer sides of the lobes at the lobe exit plane, being spaced a distance S therefrom which preferably approximates the lobe width distance W, but which may range in a given case from approximately W/4 to 3W depending on desired ejector performance and space restraints. As will be readily understood by persons skilled in this art, the relatively high velocity pressurized exhaust gases A discharging from the inside of the corrugated lobe pattern inside of the closely space shroud 18 will create an ejector pumping action to entrain large quantities of secondary air flow B along the outside of the lobes, thereby significantly increasing total mass flow at the shroud exit plane. The velocity of the total combined flow through the shroud will of course be reduced substantially from the velocity of the exhaust gases at the lobe exit plane. However, test results have shown minimal losses in thrust attributable to the decreased velocity of the total flow because of the increased mass flow by ejector action. The primary flow A and the secondary flow B are mixed in the mixing region C, which extends the length $L_2$ of shroud 18. For relatively complete mixing and acoustic attenuation to occur, it has been found that a shroud length $L_2$ exceeding 10 times the average lobe pitch P is preferred.

Suppressor systems constructed along the lines suggested by FIG. 1 have been tested to yield noise suppression characteristics of the order of 15 PNdB for aircraft turbo-jet engines in current use today. The systems tested have each provided complete routing of all of the primary flow A into lobes having equal areas and widths W, and a pitch P ranging from 2W to 4W, for uniform breakup of the primary flow. As noted previously, an ejector length $L_2$ in excess of 10 times the lobe pitch P, is normally required to provide a mixing region of sufficient size for the suppression characteristics and velocity reductions desired. Noise of much higher frequency spectrum than that of the original unsuppressed stream tube will be generated in the mixing region by the interaction of the primary and secondary flows. The amount and nature of this noise is a function of the velocities of the two flow streams, the width W of the primary lobes, and the ratio of the area of the ejector shroud to that of the lobe at the exit area of the primary flow. Except for special applications with relatively small amounts of suppression (10 PNdB or less), an acoustic lining 22 will be required to attenuate the high frequency mixing noise produced inside the ejector. The acoustic lining 22 can be composed of bulk absorbers or tuned honeycomb type panels.

Figure 2:
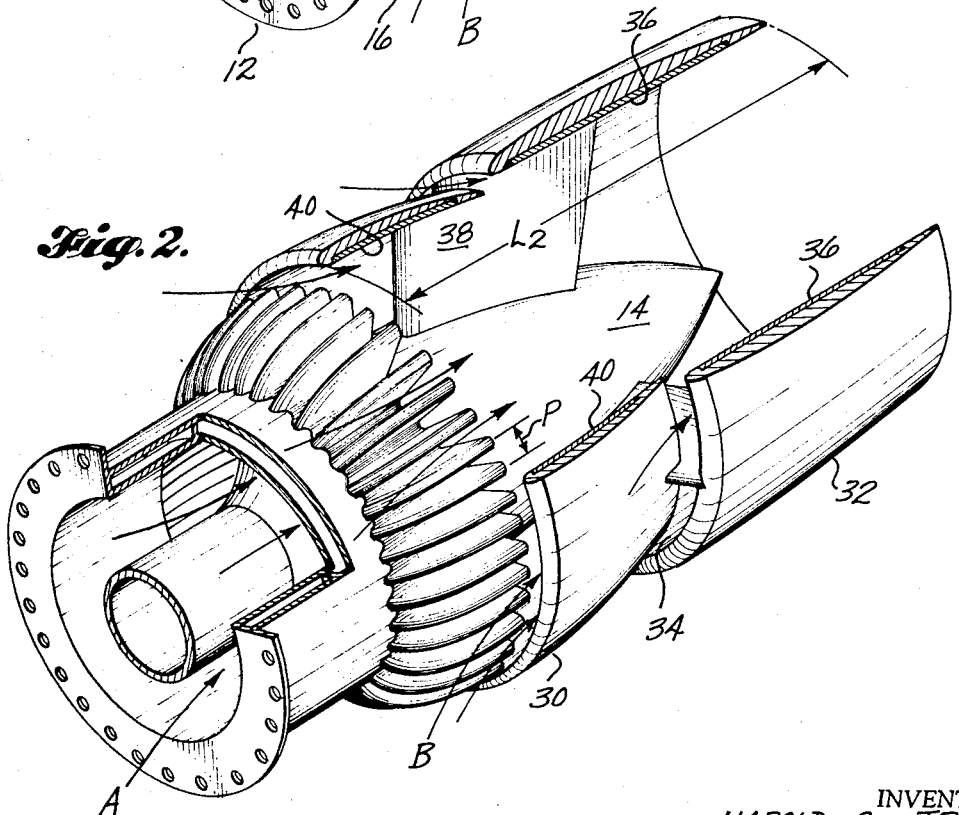
FIG. 2 shows a double shroud configuration of the invention.

FIG. 2 shows the apparatus of FIG. 1 with the lobe array in full section, the attachment flange 12 relocated for convenience, and an optional double ejector shroud system which is advantageously used in certain configurations. As the length $L_2$ of shroud 18 of FIG. 1 becomes longer, exhaust gas heating of the aft end of the acoustic liner and flow separation from the inner wall of the shroud can present problems. The FIG. 2 embodiment minimizes these problems by providing spaced-apart forward and aft shroud members 30 and 32 having a slot 34 therebetween which will draw secondary air for boundary layer control and cooling along the acoustic liner 36 of aft shroud member 32. Single centrally located strut members 38 are used to support the shroud members from centerbody plug 14, and an acoustic liner 40 is provided for forward shroud 30.

Figure 3:
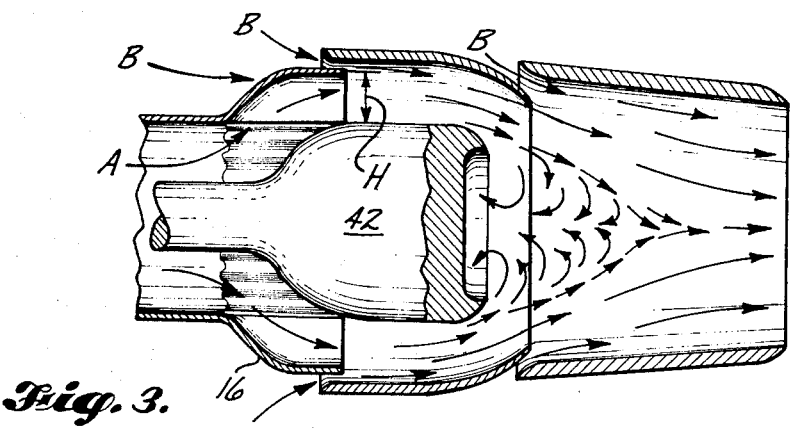
FIG. 3 is a side elevation view of a double shroud configuration wherein the centerbody plug section has been reduced in length for weight savings.

FIG. 3 is a side elevation cross-sectional view showing the flow of gases in a double shroud embodiment of the system, and further illustrating an optional cusp configuration for the centerbody plug. The boattail shape at the aft end of the centerbody plug of FIGS. 1 and 2 has here been replaced at a substantial weight savings by a cutoff plug 42 with an aerodynamically designed circular interior recess or cusp designed to set up recirculating flow patterns which will create flow streamlines similar to those of the boattail shape. FIG. 3 also shows the cross-sectional shape of a typical lobe 16 and the flow lines of primary flow A and secondary flow B. As suggested previously, at least 20 lobes of a particular average width W are utilized to obtain a desired frequency shift and ejector pumping action. The specified height H of the lobes will then be dictated by the area at the lobe exit plane required by engine cycle efficiency and space restrictions within the engine cowling structure. In general, for retrofit to an existing engine, the lobe exit area will be designed to be equal to or slightly larger than the existing engine nozzle exit area.

Figure 4:
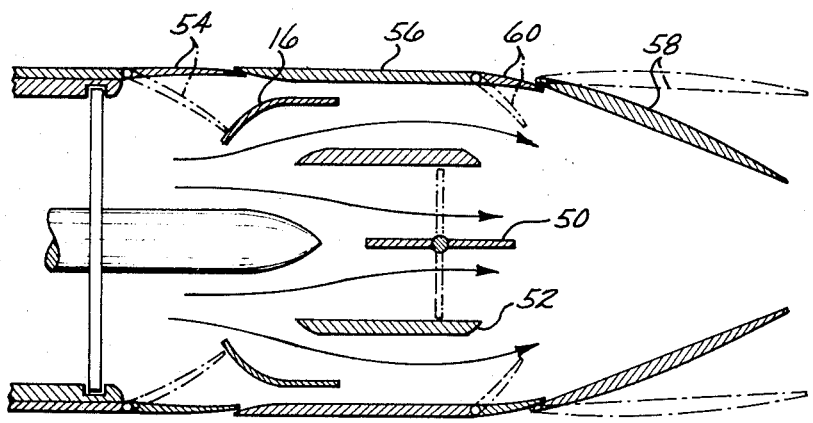
FIG. 4 is a double shroud embodiment utilizing a centerbody valve means for switching the flow pattern for the cruise and sound suppression flight modes.

FIG. 4 is a side elevation schematic view illustrating certain other features of a practical embodiment of this invention. A switching means is provided for allowing the engine flow to pass straight through the engine during cruise flight when sound suppression is not required. A valve means 50 of a conventional type is mounted within a cylindrical shell 52 for rotary movement from a closed position (dotted lines) to an open position as shown. In the closed position, the system functions as described in connection with the previous embodiments to force all of the original exhaust flow through the lobes 16. Blow-in doors 54 are opened by negative pressures created by the passage of gases through the lobes, and serve to provide entrance passageways for secondary or ambient air which is mixed with the exhaust gases in the mixing region inside of forward shroud 56 and aft shroud 58. In a manner analogous to the previous double shroud embodiments, blow-in doors 60 in FIG. 4 will open to provide a slot for admitting boundary layer and cooling air for the inner surfaces of the aft shroud 58, which will normally be lined with acoustic material (not shown here). In the open position of valve means 50 (solid lines), it can be seen that the system will pass the primary flow through both the center of the nozzle and the lobes. A variable area nozzle of an overlapping leaf type well-known in the art is used to control the ejector exit area of the aft shroud 58 to provide a cruise nozzle (as shown) or an enlarged nozzle (dotted lines) for low speed suppressor operation.

Figure 7:
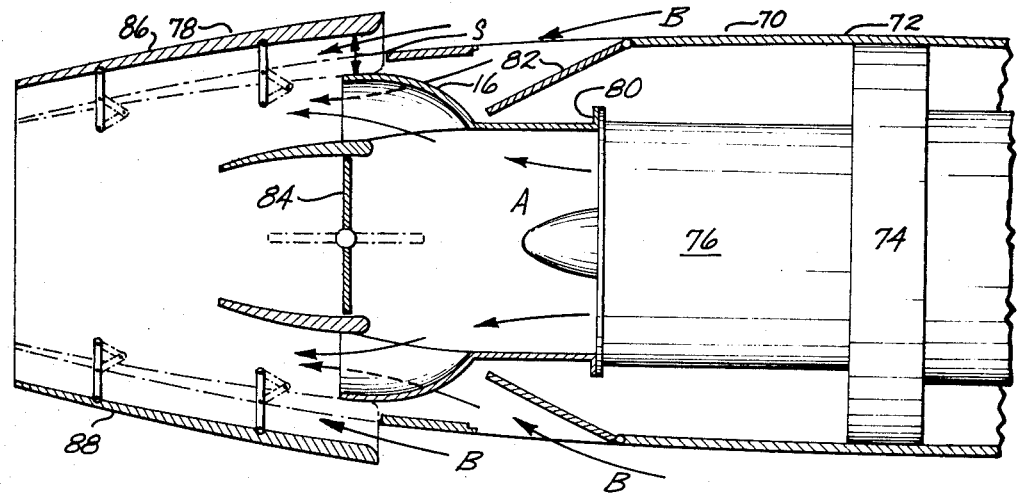
FIG. 7 is a side elevation view taken at 7—7 in FIG. 6.
Figure 5:
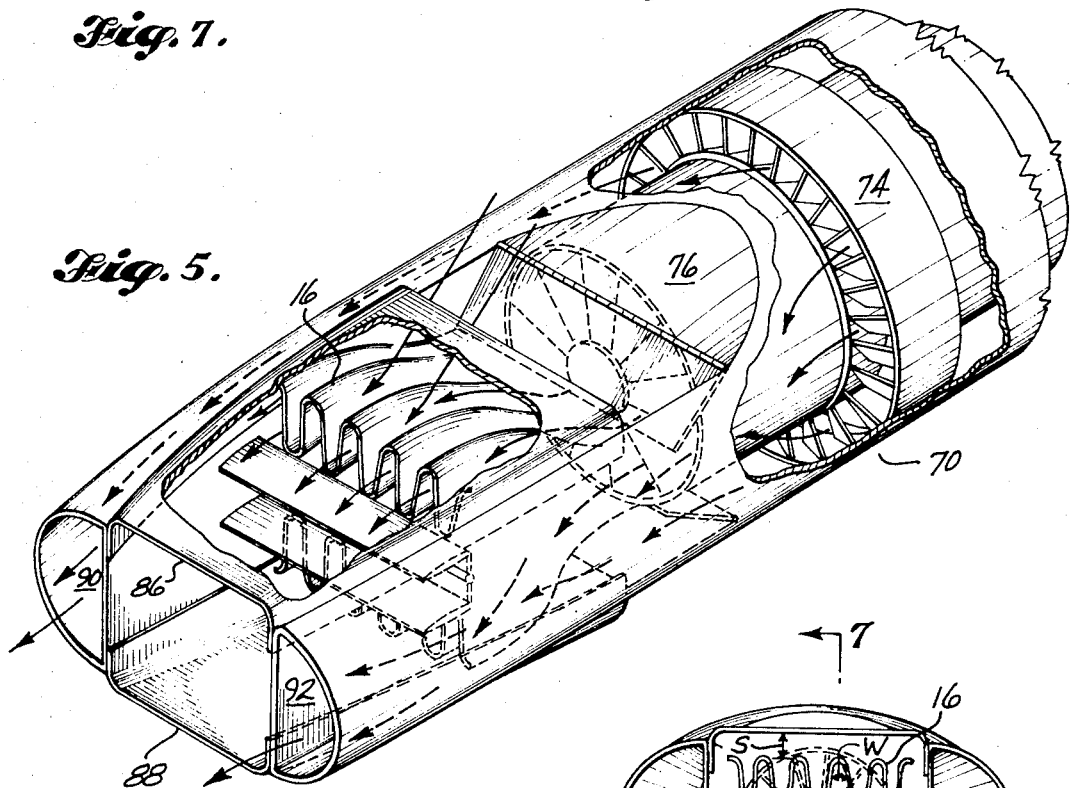
FIG. 5 is an isometric view of an optional fan-jet embodiment of the invention.
Figure 6:
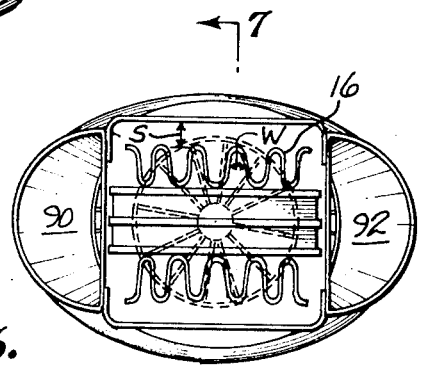
FIG. 6 is a rear view of the fan-jet configuration of FIG. 5.

FIGS. 5, 6 and 7 represent respectively an isometric view, an end view and a schematic side elevation view of a specific embodiment of the invention adapted for use with a turbofan engine. For ease of portrayal, only 12 individual lobes 16 have been shown in FIGS. 5 and 6. However, as in previous embodiments, this embodiment of the invention is intended to employ at least 20 lobes for the reasons stated previously; i. e., to raise the frequency spectrum of the mixing noise to a range readily attenuable by the acoustic shroud, to obtain better ejector pumping action, and to obtain improved mixing of exhaust and ambient air. As is best shown in the FIG. 7 schematic side elevation view, a turbofan engine 70 has an exterior cowling 72 containing a conventional fan nozzle portion 74, and a primary exhaust passageway 76. A noise suppression system 78 of the type to be described is secured by an attachment ring 80 to passageway 76. Spring biased blow-in doors 82 are installed in cowling 72 for admitting ambient air in a manner similar to that of previous embodiments. Valve means 84 is selectively rotatable from a closed position (solid lines) to a straight through position (dotted lines). In the closed position valve 84 forces all of the primary exhaust from passageway 76 through lobes 16 and into a mixing region within moveable upper and lower shrouds 84 and 86. As is more apparent in FIGS. 5 and 6, the moveable shrouds 86 and 88 have an inner position in which they nest against the lobes for cruise flight, and an outer position for noise suppression wherein they are spaced from the lobes a distance S, ranging from W/4 to 3W as in previous embodiments. Ambient air flow B is drawn by ejector action through the blow-in doors 82. In the outer position, shrouds 86 and 88 project into the airstream around the engine cowling to force ambient air to flow into the shrouds for cooling purposes and to promote mixing. In either position the shrouds form a generally rectangular exit plane at their aft ends. In this turbofan embodiment, all of the air from fan nozzle 74 is routed by "Pants leg" or bifurcated fan ducts 90 and 92 around the generally rectangular exit plane formed by the shrouds 86 and 88.

In a typical turbofan engine the fan flow may have a velocity of 1,000 ft/sec while the primary exhaust flow exiting from the lobes will have a velocity of 1,800 ft/sec. However, using the increased mass flow principles of this invention the combined exhaust and induced ambient flow at the shroud exit plane will be of the order of 1,100 ft/sec for a typical case. Accordingly, at the exit plane of the system shown the flow velocity of the fan flow emerging from the bifurcated fan ducts will closely approximate the combined flow velocity occurring within the shrouds. The advantage of this arrangement is to obtain maximum acoustic suppression in a minimum enclosed area by only treating the primary flow. Also the high velocity, high noise primary flow is more amenable to the described suppression mechanism than the low velocity fan flow.

Figure 8A:
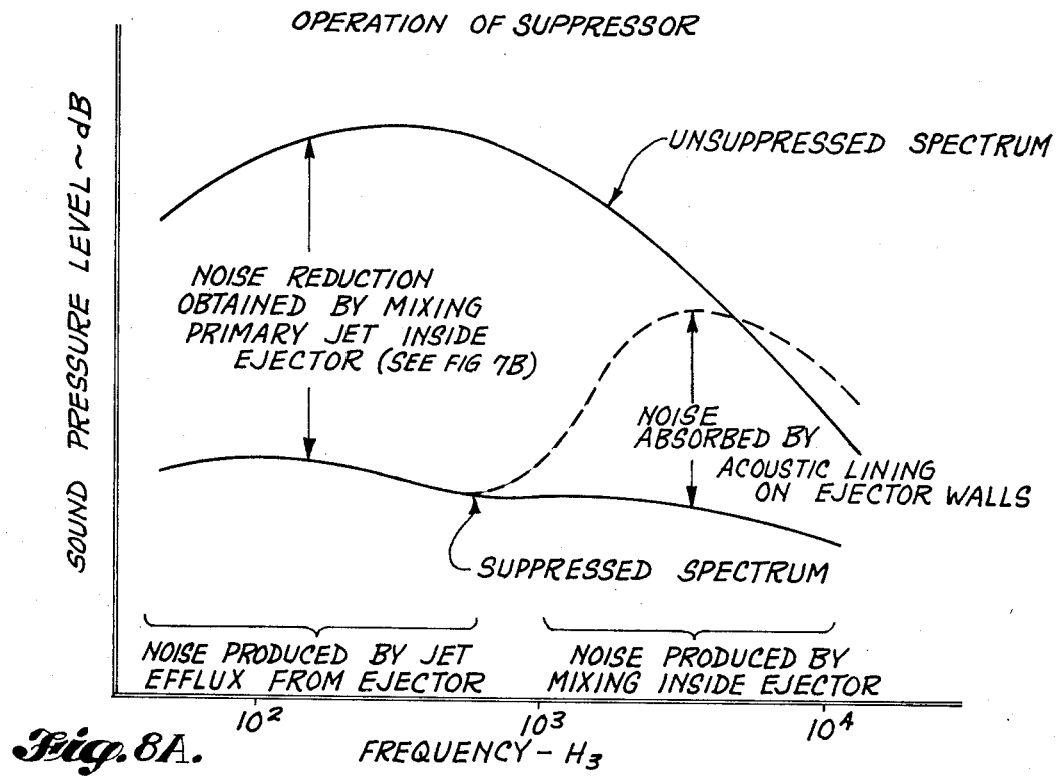
FIG. 8A is a plot which shows Sound Pressure Level vs. Frequency.

FIG. 8A presents a plot of sound pressure level vs. noise frequency which shows typical dB reductions obtainable with the disclosed suppression system. The upper curve represents an unsuppressed engine having a maximum noise level in the region around 700 Hz. The lower solid line shows the improvement obtainable through the use of an acoustically lined shroud system of this invention, wherein a reduced level is obtained which is essentially constant across the audible noise spectrum. The dotted line which joins the curve at about 800 Hz shows the noise levels which could be expected in a shroud system which is not provided with acoustic lining.

Figure 8B:
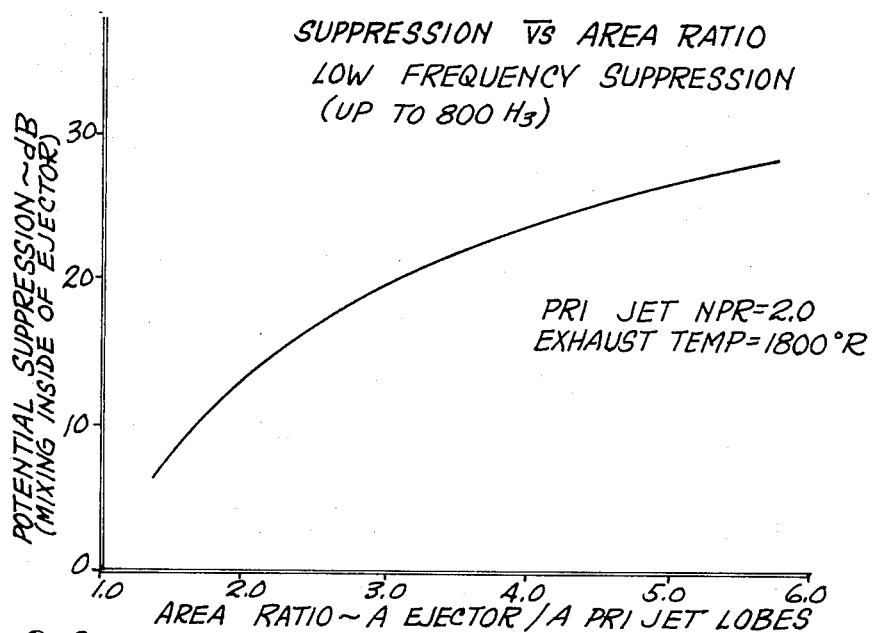
FIG. 8B is a plot showing Potential Suppression vs. Area Ratio.

While FIG. 8A illustrates the general case and therefore does not have an ordinate scale, FIG. 8B is for a specific engine, having a nozzle pressure ratio of 2.0 and an exhaust temperature of 1,800° R, and displays an ordinate scaled in decibels showing potential low frequency suppression (below 800 Hz) as a function of the area ratio of the ejector shroud area to that of the total lobe exit area of the disclosed system. The ejector shroud area, as previously defined, is the total area between the centerbody and the shroud at the lobe exit plane. For a constant area ejector with lobe width W, and a lobe pitch P of 2W, the area ratio would be approximately 2.5 for a typical lobe-shroud spacing. For this area ratio FIG. 8B shows a potential suppression in excess of 15 dB for the low frequency range. Higher area ratios within the prescribed parameter ranges will show significantly better results. Increasing the ejector area will of course raise the area ratio and thereby improve the noise suppression results, but this may not always be possible because of size limitations imposed by the engine cowling and the placement of the shroud for an ejector pumping action which will obtain an optimum mass flow.

Many variations of the preferred embodiments shown will occur to persons skilled in this art. The principles disclosed will apply to turbine engines of kinds other than those shown. The turbofan embodiment shown in FIGS. 5, 6 and 7 is a special purpose bifurcated fan configuration intended to maximize thrust while operating only on the primary flow. If desired in a particular design situation, the fan air could be routed through the lobes as secondary air either with or without the induced ambient flow. Also, the simple valve means for switching flow patterns disclosed here may of course be replaced with other means for directing flow either through the lobe elements or straight through the center of the nozzle. For example, a centerbody plug such as is shown in FIGS. 1 and 2 may be made to translate longitudinally toward and away from the lobes to thereby optionally force the flow either through the lobes or allow the flow to pass through the interior of the lobe array. Such modifications to the embodiments shown are not considered to depart from the spirit and scope of the invention. Therefore, it is intended in the appended claims to cover all such variations and modifications.

What is claimed and desired to be secured by U. S. Letters Patent is:

1. Noise suppression apparatus for use in combination with an aircraft engine exhaust passageway comprising: at least 20 generally rectangular corrugated lobes, each having the same average width W and spaced in a uniform array around said exhaust passageway such that the same pitch distance P exists between adjacent lobe centerlines, said distance P being at least 2W but less than 4W; centrally located means for directing the exhaust gas flow outwardly through said lobes; an ejector shroud means surrounding said lobes at the lobe exit plane and spaced outwardly from the outer surfaces of said lobes by a distance S which is greater than W/4 but less than 3W; secondary air passageway means located at the forward end of said shroud means for inducing flow of ambient secondary air along the outside of said lobes; said shroud means extending from said lobe exit plane longitudinally aft a distance $L_2$ at least 10P to a shroud exit plane defined by the aft end of said shroud means; wherein the exhaust gases exiting from said lobes creates pressures acting to entrain secondary air along the outer surfaces of said lobes to increase the mass flow within said shroud means while reducing the velocity of said exhaust gases.

2. The apparatus of claim 1 wherein said centrally located means is provided with a valve means for optionally either blocking flow through the center of the lobe array thereby forcing all flow outwardly through the lobes for sound suppression, or allowing flow through the center of the lobe array for increased efficiency during cruise flight.

3. The apparatus of claim 1 wherein the inside of said ejector shroud means is lined with an acoustic material substantially along its length for attenuation of high frequency sound associated with the mixing of said exhaust gases and said ambient secondary air.

4. The apparatus of claim 3 wherein said ejector shroud means comprises forward and aft shroud portions divided by slot means for entraining ambient air for boundary layer control and cooling along the inside surface of said aft shroud portion.

5. The apparatus of claim 1 wherein said centrally located means comprises an aft surface having a recess therein to create an aerodynamic flow patterns simulating those associated with a boattail fairing.

6. The apparatus of claim 2 wherein said secondary air passageway means includes blow-in doors opened by negative pressures acting on the inside of said doors.

7. The apparatus of claim 6 wherein said corrugated lobes are arranged around said valve means in an annular array and said shroud means defines a cylindrical section at said shroud exit plane.

8. The apparatus of claim 6 wherein said valve means is generally rectangular in shape and said corrugated lobes are arranged on opposite sides of said valve means, and wherein said shroud means define a generally rectangular shape at said shroud exit plane.

9. The apparatus of claim 8 wherein said engine exhaust passageway comprises bifurcated duct means for conveying fan air from a forwardly positioned fan to positions located adjacent to opposite sides of said generally rectangular shape at said shroud exit plane while keeping said fan air isolated from said corrugated lobes and said valve means.

10. Noise suppression apparatus for use in combination with an aircraft engine circular exhaust passageway comprising: an annular array of at least 20 generally rectangular corrugated fluted lobes closely surrounding and communicating with said circular exhaust passageway; each of said lobes having an average width W, a height H of at least 4W, a longitudinal length $L_1$ of at least 1.5H extending to a common lobe exit plane, and being spaced apart a pitch distance P having a value less than 4W measured circumferentially between adjacent lobe centerlines; centrally located means for directing all of the exhaust gas flow outwardly from said circular exhaust passageway into the inside of said lobes for discharge at said lobe exit plane, said centrally located means including valve means for optionally allowing flow straight through the center of said annular array for improved efficiency during cruise flight; a shroud means closely surrounding said lobe array and radially spaced apart from the outer surfaces of said lobes by a distance S having a value less than 3W; and a secondary air passageway means located at the forward end of said shroud means; wherein in a sound suppression mode of operation said valve means directs exhaust gas flow outwardly through said lobe array to thereby induce flow from said secondary air passageway means for mixing with said exhaust gases within said shroud means to increase the mass flow through said shroud.

11. The apparatus of claim 10 wherein said shroud means is radially spaced apart from the outer surfaces of said lobes by a distance S of at least W/4.

12. The apparatus of claim 11 wherein said forward end of said shroud means is located in close proximity to said lobe exit plane and extends longitudinally aft a distance $L_2$ having a value of at least 10P.

13. The apparatus of claim 12 wherein said shroud means is lined with an acoustic material for attenuation of noise associated with the mixing of said exhaust gases and said secondary air.

14. The apparatus of claim 13 wherein said secondary air passageway means includes blow-in doors actuated by differential pressures acting on said doors and said shroud means comprises forward and aft shroud portions divided by slot means for entraining ambient air for boundary layer control and cooling along the inside surface of said aft shroud portion.

15. The apparatus of claim 14 wherein said slot means comprises blow-in doors and said aft shroud comprises variable area nozzle means for improved engine efficiency throughout the flight regime.

* * * * *

UNITED STATES PATENT OFFICE
CERTIFICATE OF CORRECTION

Patent No. 3,710,890    Dated January 16, 1973

Inventor(s) Harold C. True et al.

It is certified that error appears in the above-identified patent and that said Letters Patent are hereby corrected as shown below:

IN THE CLAIMS:

Claim 1, column 7, line 21, delete "at least 2W but".

Claim 10, column 8, line 20, delete "of at least 4W" and insert therefor -- less than 12W --.

Signed and sealed this 10th day of December 1974.

(SEAL)
Attest:

McCOY M. GIBSON JR.
Attesting Officer

C. MARSHALL DANN
Commissioner of Patents

FORM PO-1050 (10-69)